Nov. 12, 1935.  J. LENHART  2,021,069
WINDOW CLEANER
Filed March 14, 1934    4 Sheets-Sheet 1

John Lenhart
INVENTOR
BY Victor J. Evans & Co.
ATTORNEYS

Nov. 12, 1935.  J. LENHART  2,021,069
WINDOW CLEANER
Filed March 14, 1934  4 Sheets-Sheet 2
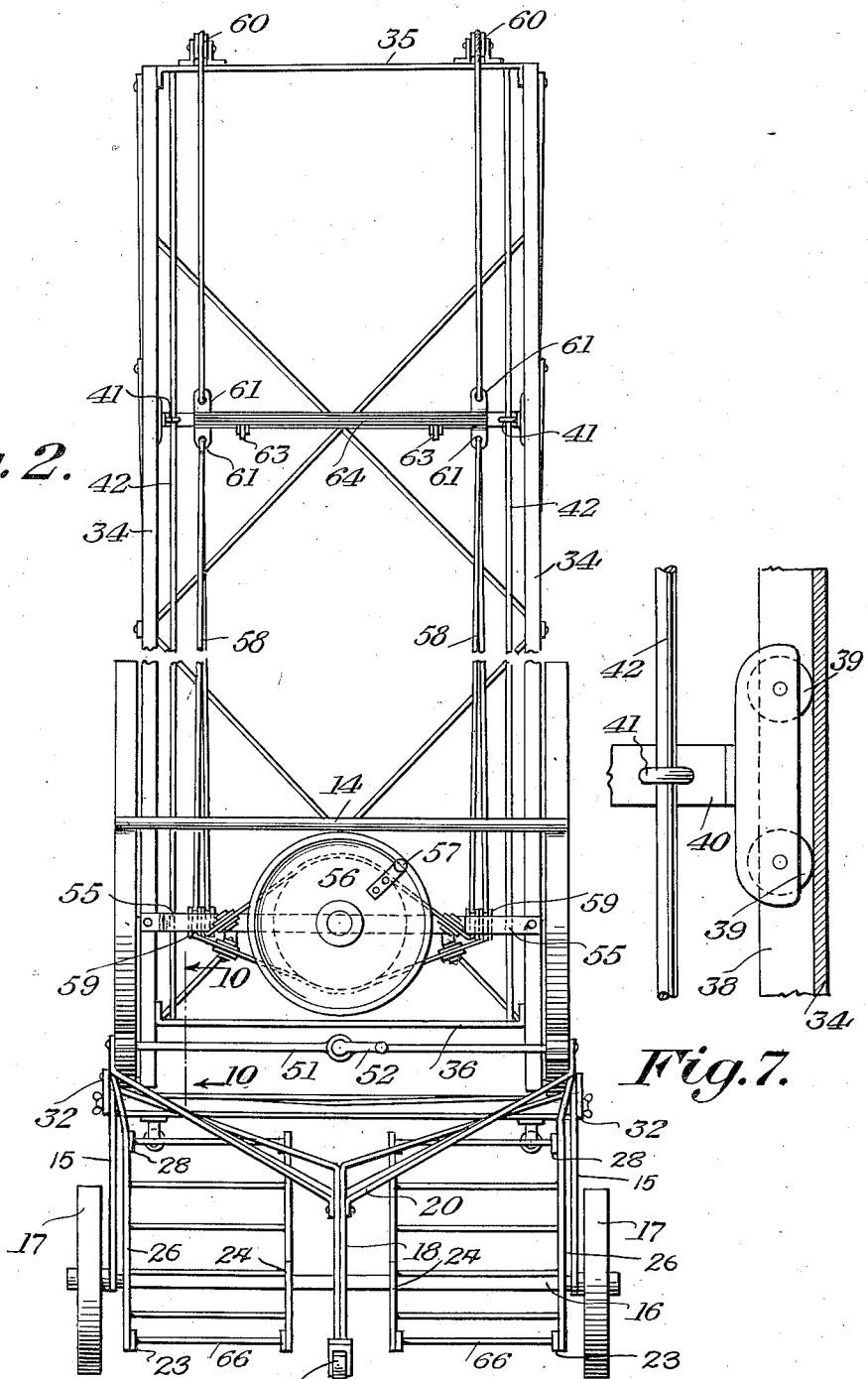

Nov. 12, 1935.  J. LENHART  2,021,069
WINDOW CLEANER
Filed March 14, 1934  4 Sheets-Sheet 3
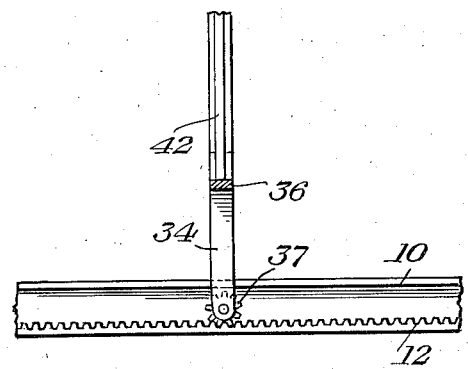
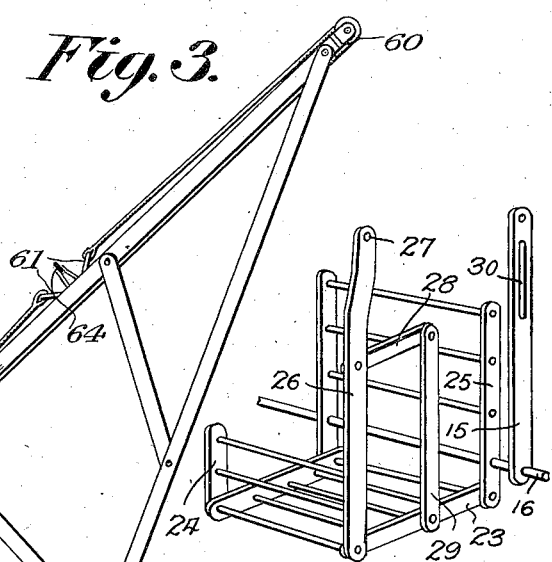
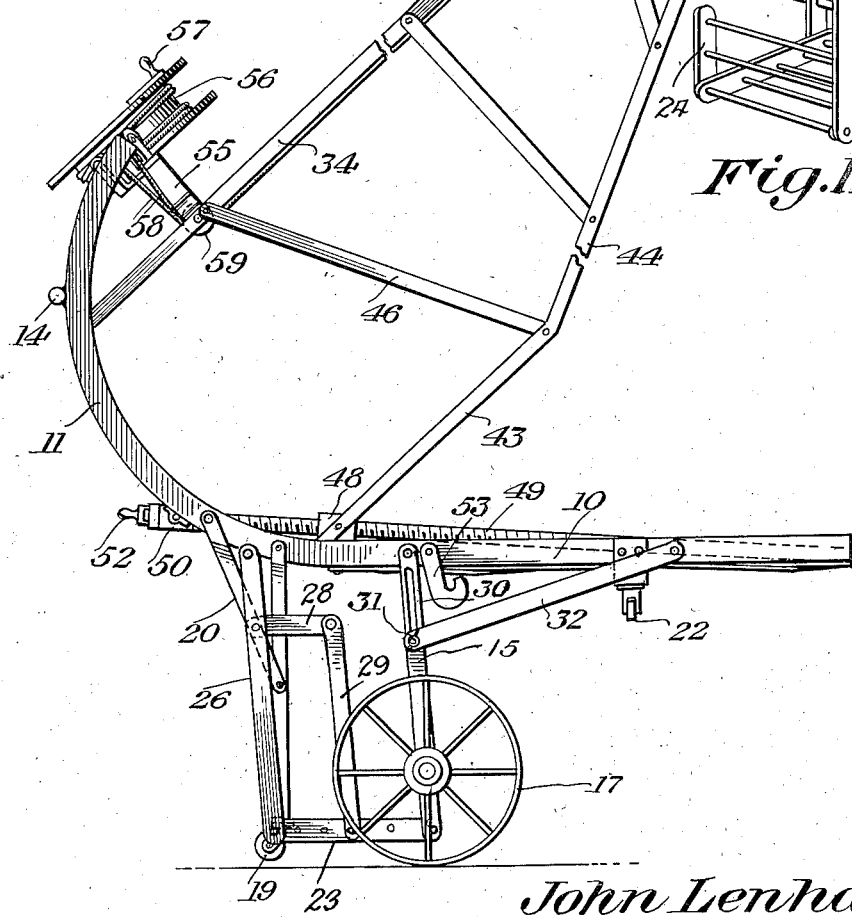
John Lenhart
INVENTOR
BY Victor J. Evans & Co.
ATTORNEYS Nov. 12, 1935.  J. LENHART  2,021,069
WINDOW CLEANER
Filed March 14, 1934  4 Sheets-Sheet 4

John Lenhart
INVENTOR
BY Victor J. Evans & Co.
ATTORNEYS

Patented Nov. 12, 1935

2,021,069

UNITED STATES PATENT OFFICE 2,021,069

WINDOW CLEANER

John Lenhart, Los Angeles, Calif.

Application March 14, 1934, Serial No. 715,560

4 Claims. (Cl. 15—103)

The invention relates to a window cleaner and more especially to a window cleaner adapter.

The primary object of the invention is the provision of an apparatus of this character, wherein a wiper for a window glass can be positioned relative to the glass so that the surface thereof can be thoroughly cleaned and wiped, the apparatus being adjustable to permit the mounting thereof at a window frame and will support the wiper so that it can be operated from within the inclosure having the window frame for the thorough cleaning of the window.

Another object of the invention is the provision of an apparatus of this character, wherein its construction is such that it may be readily and easily adjusted with dispatch so that it can be protruded through a window frame to the exterior of an inclosure and is operable from within the inclosure for the cleaning of the window glass from without, thereby eliminating the necessity of a person assuming hazardous positions outside of the window for the manual cleaning of the same, the apparatus being novel in its entirety.

A further object of the invention is the provision of an apparatus of this character, which is comparatively simple in construction, readily and easily operated, thoroughly reliable and efficient in its purposes, portable, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 2 is a front elevation.

Figure 3 is a view similar to Figure 1 showing the apparatus released from the window sill and in an adjusted position.

Figure 7 is a sectional view on the line 7—7 of Figure 5.

Figure 10 is a sectional view on the line 10—10 of Figure 2.

Figure 11 is a fragmentary detailed perspective view of one of the racks of the window cleaner.

Similar reference characters indicate corresponding parts throughout the several views in the drawings.

Figure 9:
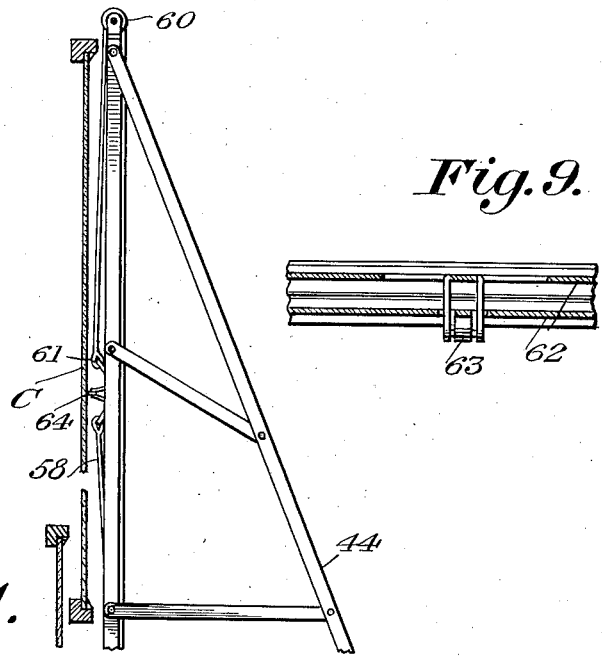
Figure 9 is a sectional view on the line 9—9 of Figure 8.

Referring to the drawings in detail, A designates conventionally a window sill, B and C the lower and upper sashes respectively of a window, these being of the usual construction and also mounted in the ordinary way for vertical sliding movements. The apparatus constituting the present invention comprises a pair of spaced parallel tracks 10, each formed from a channel iron having an upwardly curved or circular end portion 11, while internally of the channels of the irons 10 are toothed racks 12 for a purpose hereinafter fully described.

The tracks 10 are sustained rigid relative to each other through the series of crossed braces 13, while the curved portions 11 carry a handle bar 14 disposed crosswise and joined therewith or mounted in any suitable fashion. Pivoted to the tracks 10 at an intermediate point are hangers 15 carrying an axle 16 having journaled thereon traction wheels 17, these being disposed outside of the hangers. Attached to the tracks 10 spaced from the hangers 15 is a caster bracket 18 having fitted therein a swiveled caster 19 and this bracket is held perpendicular through the medium of a brace 20, the caster 19 being adapted to engage with a floor or foundation. Carried by the tracks 10 are blocks 21 in which are swiveled casters 22, these being adapted to contact with the sill A when the apparatus is positioned for the service thereof in the cleaning of the window glass of the sashes B and C.

Supported by each track and the axle 16 are suitable racks for the carrying of window cleaning equipment, such as a water bucket, cloths, etc., (not shown) and each rack includes a cross runged bottom section 23, front cross runged section 24 and a rear cross runged section 25, respectively, the front section 24 including therewith a shifter lever 26 which has its upper end pivoted, at 27, to the track next thereto, while the side pieces of the rear section 25 are pivotally engaged upon the axle 16 and thus it will be seen that when the said axle is swung arcuately both racks just referred to will be swung therewith and into these racks are introduced the equipment mentioned.

Through the medium of the pivotally connected linkage 28 and 29, these being also pivoted to the shifter lever 26 and the section 23, serve as outside guards to the said racks to prevent contact of the bucket or other equipment carried by the racks from working laterally outwardly from the racks in contact with the wheels 17. Each hanger 15 is provided with an elongated slot 30 in which is fitted an adjustable fastener 31 for a lever 32 pivoted, at 33, to the companion track 10. Thus it will be seen that when the fastener 31 is loosened and the hangers 15 are angularly changed the wheels 17 will be raised or lowered relative to a floor or foundation and when raised out of contact with the latter the caster 19 will engage therewith, while the casters 22 will be brought to rest on the window sill A and in this manner the cleaner supported, the wheels 17 being shown elevated in Figures 1 and 2 of the drawings and the casters 19 and 22 resting upon the floor or foundation and the said sill. In Figure 3 of the drawings the wheels 17 are contacting with the floor or foundation and the caster 19 elevated therefrom.

Movably supported by the tracks 10 is a carriage in the form of a frame including side members 34 and the upper and lower cross pieces 35 and 36 respectively, these spacing the members 34 from each other and parallel one to the other. The members at their lower ends have journaled thereon rack pinions 37 which engage the racks 12 in the channel irons 10 constituting the tracks. These members 34 are formed with guide channels 38 opening inwardly of the carriage for accommodating or receiving the rollers 39 of a slide 40 having the eyes 41 embracing rods 42 carried by the cross pieces 35 and 36 of the carriage.

Figure 1:
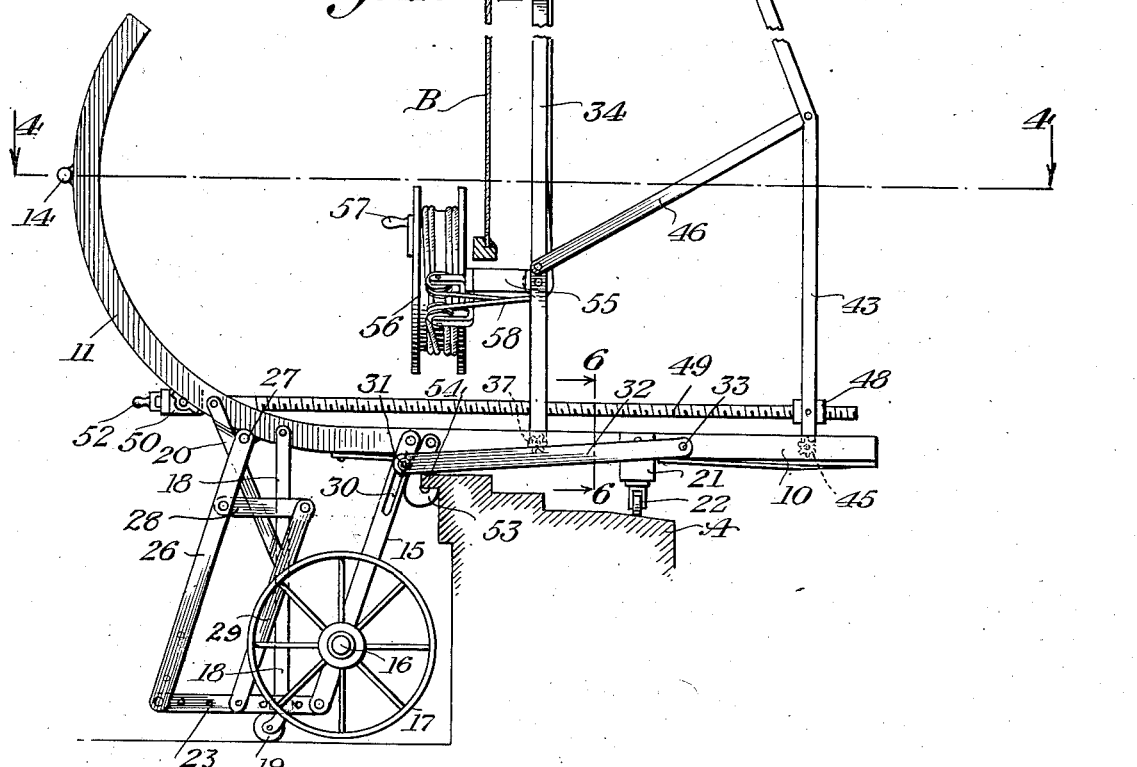
Figure 1 is a fragmentary vertical sectional view through a window sill showing the apparatus in elevation constructed in accordance with the invention.
Figure 4:
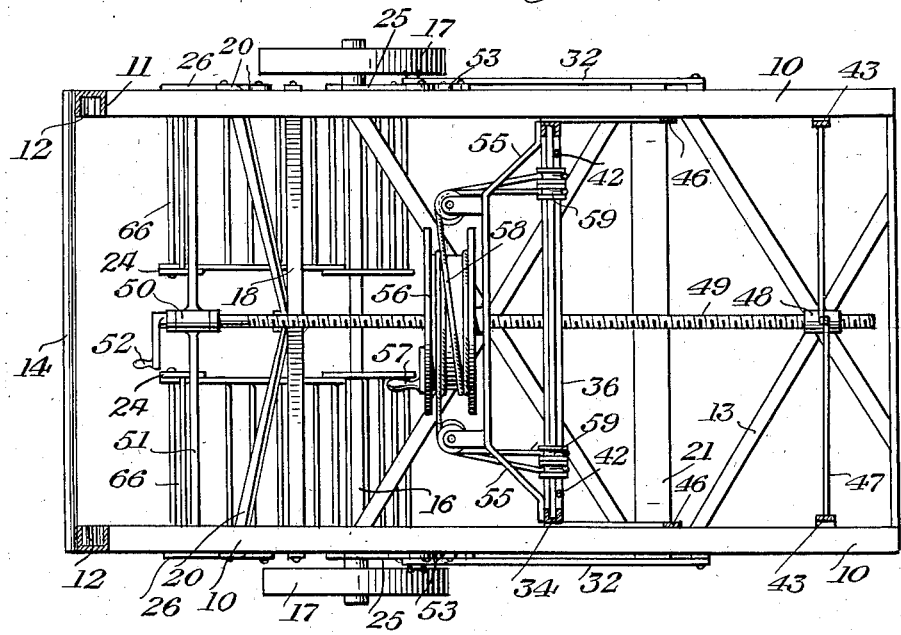
Figure 4 is a sectional view on the line 4—4 of Figure 1 looking in the direction of the arrows.
Figure 5:
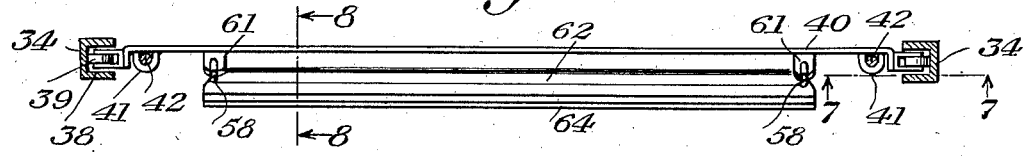
Figure 5 is a horizontal transverse sectional view through the apparatus.
Figure 6:
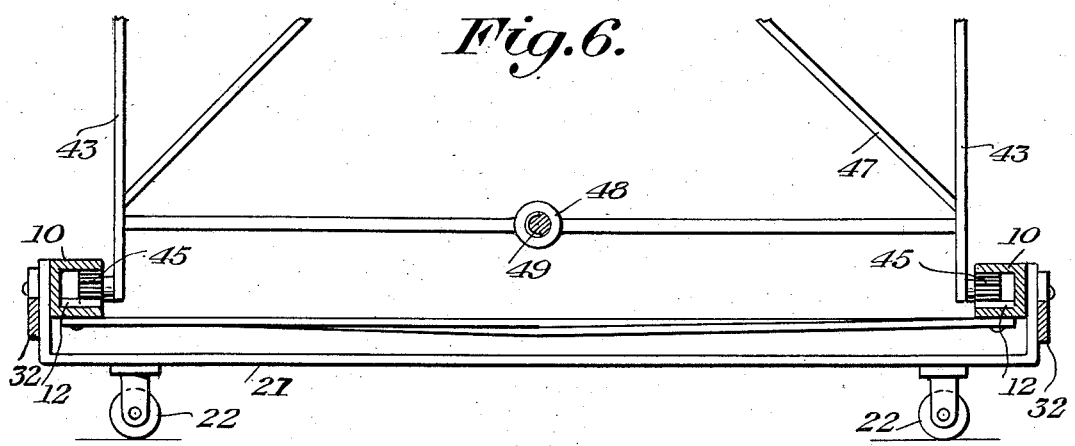
Figure 6 is an enlarged detail sectional view on the line 6—6 of Figure 1.

The side members 34 of the carriage are fitted with offset legs 43, these having the angular portions 44 for their offsetting and said legs support rack pinions 45 engaging the racks 12 in the tracks 10. The legs 43 are augmented by braces 46 connected therewith and to the side members 34 and arranged between and supported by these legs 43 is a hanger 47 formed with a central internally threaded sleeve 48 engaging a feed screw 49 journaled in a bearing 50 aligned with the sleeve 48 and supported by a hanger 51 carried by the tracks 10. The hangers 47 and 51 are swiveled and the feed screw 49 carries a hand crank 52 for manual operation thereof. It will be apparent that by turning the feed screw 49 at the operative side of the apparatus the carriage 34 can be swung to perpendicular position or angularly as is clearly illustrated in Figures 1 and 3 of the drawings and by the angular adjustment of said carriage the same can be projected through a window on the raising of the lower sash B to position the apparatus with the carriage 34 outside of the window whence it will be brought to perpendicular position as shown in Figure 1 of said drawings. In the position of the cleaner as shown in Figure 1 of the drawings such cleaner will be in a position for service in cleaning the panes of the sashes of the windows and thus the casters 19 and 22 will have contact with the floor or foundation and the sill, respectively, the cleaner being held in this position in a manner presently described.

The tracks 10 have pivotally connected therewith latch hooks 53 which are adapted to be brought into engagement with the ledge 54 of the window sill A for the securing of the apparatus in a fixed position for service.

Mounted upon the carriage, that is, the side members 34 thereof, is a bracket 55 supporting centrally thereof a windlass 56 having a handle 57 and reversely wound upon this windlass 56 are cables 58, these being trained over suitable guide pulleys 59 and 60, the latter being on the cross piece 35 while the pulleys 59 are upon the bracket 55. The cables are connected with ears 61 on the slide 40 so that by turning the windlass 56 clockwise or counterclockwise the said slide 40 will be shifted for movement longitudinally of the carriage as should be obvious.

Figure 8:
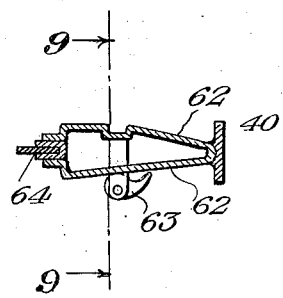
Figure 8 is a sectional view on the line 8—8 of Figure 5.

The slide 40 has thereon a brush or wiper holder preferably in the form of a pair of opposed spring jaws 62 having the eccentric cams 63 and in this holder is adapted to be removably fitted a brush or wiper, the wiper being indicated at 64 in Figure 8 of the drawings. The wiper, when the carriage has been positioned for service, will act upon the surface of the glass in the window by contact therewith and on the shifting of the slide 40 the glass will be cleaned. The wiper 64, brush or other cleaning medium may be treated with a cleaning fluid to enable the proper cleaning of the glass in the operation of the apparatus.

On manual operation of the feed screw 49 the carriage with the side members 34 and legs 43 can be properly adjusted so as to locate the holder 62 with respect to the parts of the window to be cleaned and the apparatus may be shifted laterally upon the casters 19 and 22 so as to enable a complete cleaning of the parts throughout the width thereof. The apparatus is adaptable to the part to be cleaned and the lower sash B can be readily cleaned by shifting it to the upper part of the window on the lowering of the upper sash C. As has been stated the apparatus is projected through the window frame by the raising of the lower sash and angularly adjusting the carriage to allow the same to be moved through the window frame to without the same and thereafter this carriage is set for the placing of the holder to bring the cleaning medium therein in contact with the part to be cleaned.

The racks are provided with cross rungs 66 which adapt them for supporting buckets or baskets or both, so that water as may be held by the buckets is available for use during the cleaning period, while the baskets will serve to hold cloths or other cleaning mediums so it will be apparent that these frames constitute carriers in the apparatus.

It is of course to be understood that changes, variations and modifications may be made in the apparatus as come properly within the scope of the appended claims without departing from the spirit of the invention or sacrificing any of its advantages.

The operation of the apparatus should be apparent from the foregoing description when taken in connection with the accompanying drawings and therefore a more extended explanation has been omitted.

What is claimed is:—

1. A cleaner of the character described comprising a pair of spaced horizontal tracks having straight portions and upwardly curved portions, toothed racks fitting in said tracks, a frame having legs and being in an upright position when supported by the horizontal part of said tracks, pinions carried by the frame and its legs and supporting the same on said toothed racks, casters arranged in spaced relation to each other and carried by said tracks, one being adapted to engage a floor or foundation and the others a sill of a window, hangers swingingly supported by said tracks intermediate with relation to said casters, wheels carried by said hangers, whereby by swinging said hangers the wheels can be elevated for effecting contact of the casters or lowered to bring said casters out of contact with the foundation and sill, and manually operable window cleaning means on said frame.

2. A cleaner of the character described comprising a pair of spaced horizontal tracks having straight portions and upwardly curved portions, toothed racks fitting in said tracks, a frame having legs and being in an upright position when supported by the horizontal part of said tracks, pinions carried by the frame and its legs and supporting the same on said toothed racks, casters arranged in spaced relation to each other and carried by said tracks, one being adapted to engage a floor or foundation and the others a sill of a window, hangers swingingly supported by said tracks intermediate with relation to said casters, wheels carried by said hangers, whereby by swinging said hangers the wheels can be elevated for effecting contact of the casters or lowered to bring said casters out of contact with the foundation and sill, manually operable window cleaning means on said frame, and manually operable means for shifting the frame relative to the tracks.

3. A cleaner of the character described comprising a pair of spaced horizontal tracks having straight portions and upwardly curved portions, toothed racks fitting in said tracks, a frame having legs and being in an upright position when supported by the horizontal part of said tracks, pinions carried by the frame and its legs and supporting the same on said toothed racks, casters arranged in spaced relation to each other and carried by said tracks, one being adapted to engage a floor or foundation and the others a sill of a window, hangers swingingly supported by said tracks intermediate with relation to said casters, wheels carried by said hangers, whereby by swinging said hangers the wheels can be elevated for effecting contact of the casters or lowered to bring said casters out of contact with the foundation and sill, manually operable window cleaning means on said frame, manually operable means for shifting the frame relative to the tracks, and article containing racks pivotally connected with the tracks and with the axle for said wheels.

4. A cleaner of the character described comprising a pair of spaced horizontal tracks having straight portions and upwardly curved portions, toothed racks fitting in said tracks, a frame having legs and being in an upright position when supported by the horizontal part of said tracks, pinions carried by the frame and its legs and supporting the same on said toothed racks, casters arranged in spaced relation to each other and carried by said tracks, one being adapted to engage a floor or foundation and the others a sill of a window, hangers swingingly supported by said tracks intermediate with relation to said casters, wheels carried by said hangers, whereby by swinging said hangers the wheels can be elevated for effecting contact of the casters or lowered to bring said casters out of contact with the foundation and sill, manually operable window cleaning means on said frame, manually operable means for shifting the frame relative to the tracks, article containing racks pivotally connected with the tracks and with the axle for said wheels, and hooks carried by the tracks and engageable with the window sill for properly positioning the cleaner therewith.

JOHN LENHART.